United States Patent
Collie

[15] 3,701,935
[45] Oct. 31, 1972

[54] CIRCUIT FOR FOOD MIXER

[72] Inventor: Arthur A. Collie, Hayling Island, England

[73] Assignee: Kenwood Manufacturing (Working) Limited, Hampshire, England

[22] Filed: June 23, 1971

[21] Appl. No.: 156,038

Related U.S. Application Data

[63] Continuation of Ser. No. 812,002, April 1, 1969, abandoned.

[52] U.S. Cl. ............318/325, 318/345, 318/397
[51] Int. Cl. .................................H02p 5/08
[58] Field of Search......318/227, 325, 327, 331, 345, 318/397

[56] References Cited

UNITED STATES PATENTS

| | | | |
|---|---|---|---|
| 3,223,911 | 12/1965 | Seiler et al. | 318/325 |
| 3,418,558 | 12/1968 | Morgan et al. | 321/43 |
| 3,238,434 | 3/1966 | Blitz et al. | 318/325 |
| 3,242,409 | 3/1966 | Edwards | 318/325 |
| 3,470,436 | 9/1969 | Steele | 318/227 |

Primary Examiner—Gene Z. Rubinson
Attorney—Stevens, Davis, Miller & Mosher

[57] ABSTRACT

An alternating current electric motor speed control circuit including a bi-directional semiconductor control element in the motor circuit triggered from a blocking to a conductive state by the application of a potential to its control electrode applied through governor contacts of a motor speed governor contacts, which contacts are closed when the motor speed drops below a particular value which can be varied and which carry a small proportion of the total motor current.

4 Claims, 3 Drawing Figures

Inventor
ARTHUR A. COLLIE

By
STEVENS, DAVIS, MILLER & MOSHER
Attorneys

CIRCUIT FOR FOOD MIXER

This application is a continuation of Ser. No. 812,002, filed Apr. 1, 1969 and now abandoned.

This invention relates to an alternating current electric motor control circuit.

It is known to control the speed of an electric motor by means of a governor having electric contacts connected in the motor control circuit and rotated with the armature of the motor so that when the speed of the motor exceeds a given value the contacts are open and the speed of the motor is reduced. This arrangement suffers from the disadvantage that the contacts carry the full load of the motor current and are therefore subject to considerable wear.

According to the present invention there is provided an alternating current electric motor control circuit including a bi-directional semiconductor control element in the motor circuit, a gate or control electrode of the element connected to governor contacts of a motor speed governor, so that the conductivity of the element is varied according to whether the governor contacts are open or closed and a series combination of an electrically resistive element and a capacitive reactive element connected in parallel with the semiconductor control element.

In order that the invention may be more clearly understood the following description is given merely by way of example reference being made to the accompanying drawings, in which.

Figure 1:
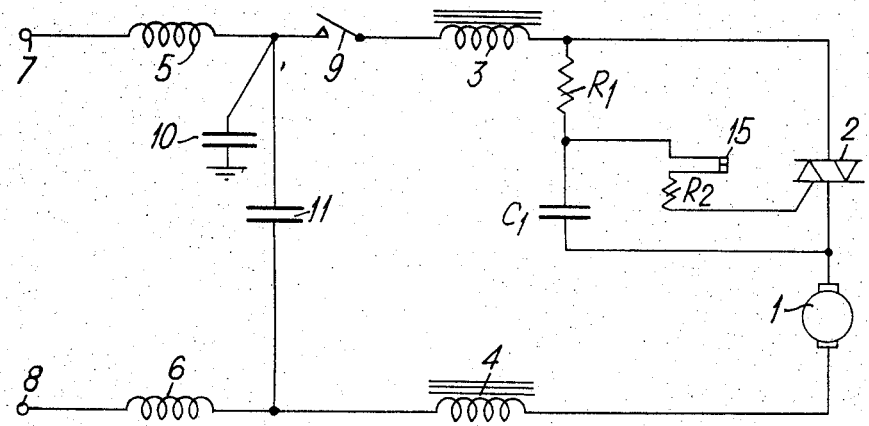
FIGS. 1 and 2 show circuit diagrams of two control circuits.

Referring to FIG. 1 there is shown a circuit including a motor armature 1 connected in series with a bi-directional semiconductor control element 2, field windings 3 and 4, and interference suppression chokes 5 and 6 across a pair of supply terminals 7 and 8. A control switch 9 is connected between the choke 5 and the field winding 3 and the fixed contact of the switch 9 is earthed via a 0.01 microfarad capacitor 10 and connected to the junction between the choke 6 and a field winding 4 via a 0.1 microfarad capacitor 11. Across the element 2 there is connected a resistor R1 in series with a capacitor C1. The resistor R1 is of the order of 100 ohms and the capacitor C1 of the order of 0.1 microfarads. The junction of the resistor R1 and the capacitor C1 is connected via a pair of governor contacts 15 for the motor and a resistor R2 to the control electrode of the element 2.

Figure 2:
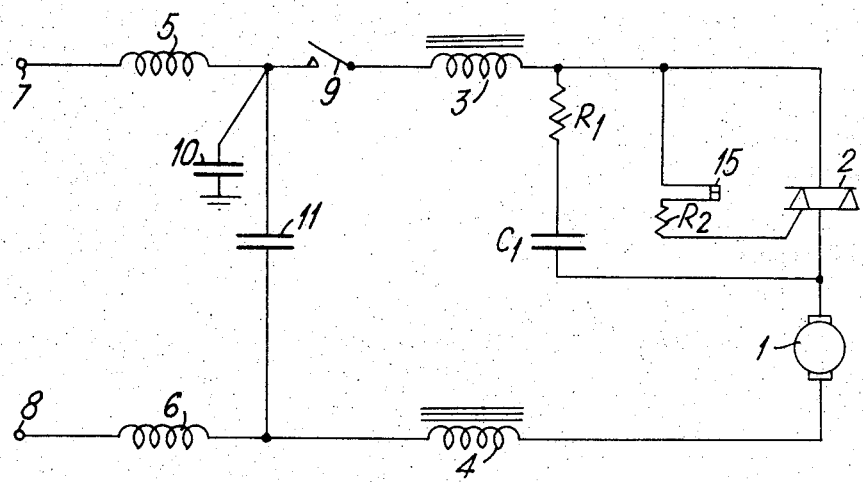

FIG. 2 shows a circuit including all the elements of FIG. 1, but with the variation that the current through the governor contacts 15 does not pass through the resistor R1.

The bi-directional semiconductor control element is a bi-directional triode thyristor which may be triggered from a blocking to a conductive state for either polarity of an applied voltage above a given value to its gate or control electrode. The device is similar in effect to two semiconductor control rectifiers connected in parallel and in reverse directions. Suitable elements are known commercially as Triacs.

Thus by suitably proportioning the circuit including the resistor R1 and the capacitor C1 it is possible to apply a triggering voltage to the control electrode of the element 2 every time that the governor contacts 15 close.

Figure 3:
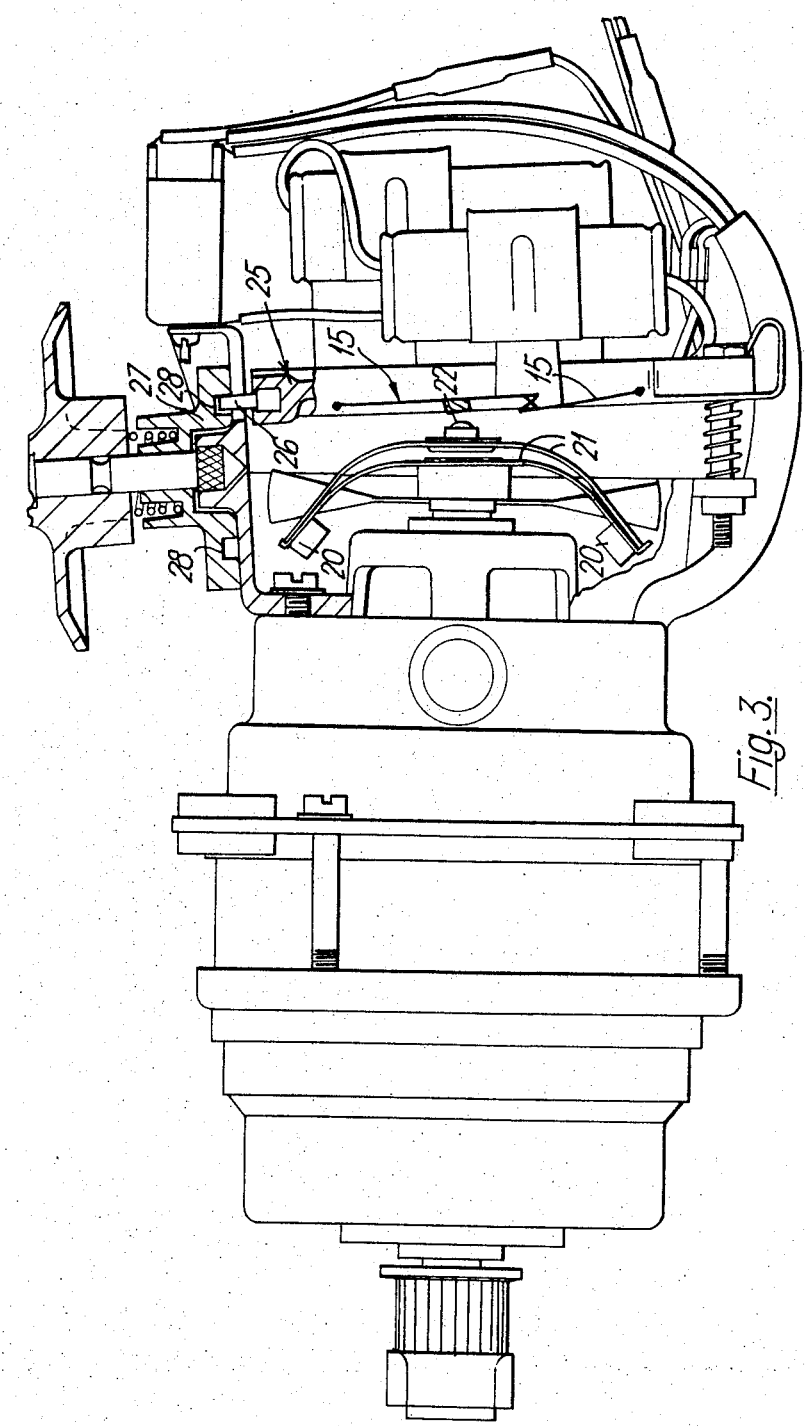
FIG. 3 shows a governor for use with the invention.

In operation it is arranged that the governor contacts 15 are closed when the motor is rotating at normal speeds and that these contacts are opened when the motor speed exceeds a given value. As illustrated in FIG. 3 of the accompanying drawings, the governor consists of weights 20 fixed to flexible members 21, so that the weights are displaced further from the axis of the motor as the motor speed increases, and a ball bearing 22 at the center of the governor which moves axially away from the motor as the weights fly out. The contacts 15 are positioned so as to be opened by the advancing ball bearing at a particular motor speed. The position of the contacts 15 can be varied from outside the motor, as they are supported on a contact bearing plate 25, which can be moved by a snail cam arrangement consisting of a pin 26 attached to the plate 25 and inserted in a groove 28 in a head 27 which is rotatable. As the groove 28 is not circular, pin 26 and plate 25 move parallel to the motor axis when the head 27 is rotated. Each position of the plate 25 defines a motor speed at which the contacts 15 will be separated by the ball bearing 22.

When the contacts open the element 2 reverts to a blocking state at the next reversal of the supply current, that is when the current through the element and the motor falls below the holding current for the element, and the speed of the motor automatically falls. When the motor speed falls below the given value the governor contacts 15 close and the potential applied to the control electrode of the element 2 causes the element to conduct and the mean motor speed to be maintained.

There is thus provided an arrangement in which the governor contacts 15 carry a very small current of a few milli-amperes while the semiconductor element 2 handles the main motor current. The arrangement enables more powerful motors to be used than were used previously, since the limitation imposed by the burning up of the contacts does not exist.

The arrangement is suitable for use in controlling the speed of motors in such appliances as food mixers and sewing machines. In the latter case a remote control may be provided to control the setting of the contacts which governs the speed of the motor. The arrangement may also be used in controlling speed of motors in hand held appliances or tools.

I claim:

1. In an alternating current electric motor control circuit comprising, in combination:
   a. an alternating current electric motor including an armature and first and second field windings coupled in series one on each side of said armature,
   b. an alternating current motor supply circuit coupled to said first and second field windings, and
   c. a motor speed governor having a pair of contacts separable in response to the speed of said motor exceeding a given value,
   the improvement comprising:
   d. a bi-directional triode thyristor coupled in series between said first field winding and said armature, said thyristor having a control electrode coupled to one of said pair of contacts,
   e. an electrical resistive element and a capacitive reactive element connected in series with each other and in parallel with said thyristor, and f. the other of said pair of contacts being coupled to the conductive path between said first field winding and said thyristor.

2. An electric motor control circuit as defined in claim 1, in which said other of said pair of contacts is connected to a junction of said resistive element and said capacitive reactive element.

3. An electric motor control circuit as defined in claim 1, further comprising first and second interference suppression chokes coupled in series with said first and second field windings, respectively, and said electric motor supply circuit.

4. In an alternating current electric motor control circuit comprising, in combination:
 a. an alternating current electric motor including an armature and first and second field windings coupled in series one on each side of said armature,
 b. an alternating current motor supply circuit coupled to said first and second field windings, and
 c. improvement comprising: motor speed governor having a pair of contacts separable in response to the speed of said motor exceeding a given value, the improvement comprising:
 d. a bi-directional triode thyristor coupled in series between said first field winding and said armature, said thyristor having a control electrode coupled to one of said pair of contacts,
 e. an electrical resistive element and a capacitive reactive element connected in series with each other and in parallel with said thyristor,
 f. a further resistive element connected in series between said one of said pair of contacts and said control electrode,
 g. the other of said pair of contacts being coupled in the conductive path between said first field winding and said thyristor,
 h. two interference suppression choke means, coupled in series in said electric motor supply circuit, one on each side of said motor,
 i. capacitor means connected in parallel with said motor and in series with said choke means; and
 j. switch means in that part of said motor supply circuit which is in parallel with said capacitor means.

* * * * *